July 3, 1951     J. A. GRANT     2,558,843
FUEL CONTROL DEVICE FOR INTERNAL-COMBUSTION ENGINES
Filed Oct. 9, 1945     2 Sheets-Sheet 1
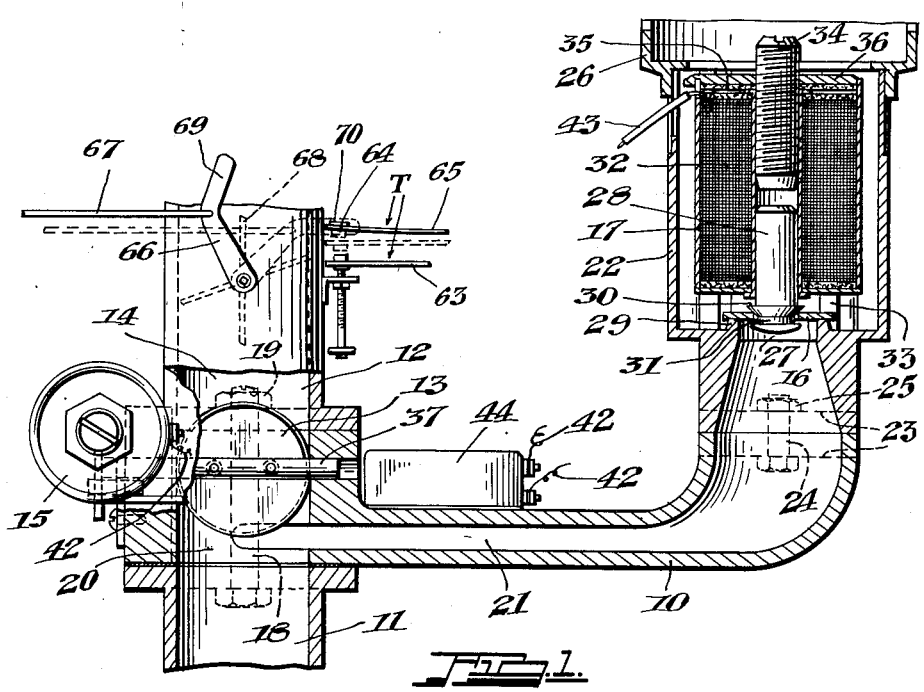
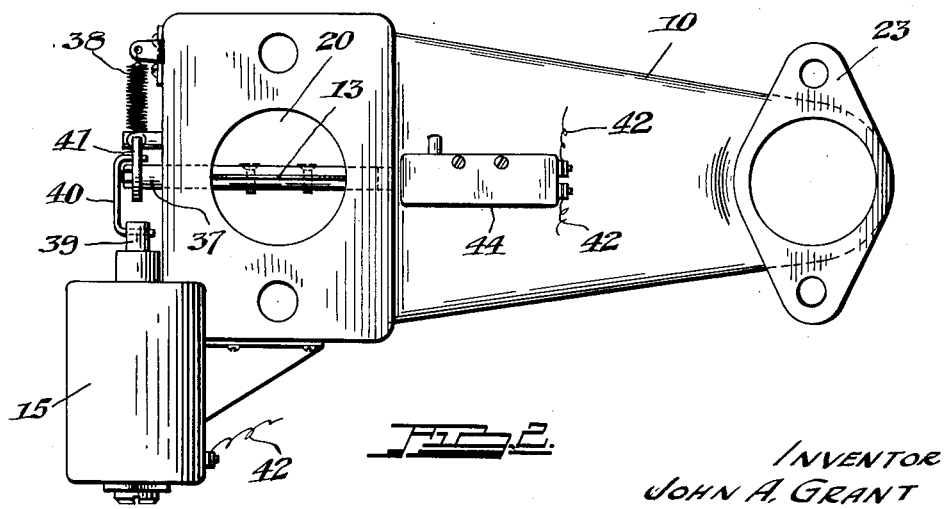
INVENTOR
JOHN A. GRANT
Fetherstonhaugh & Co.
By
ATTORNEYS.

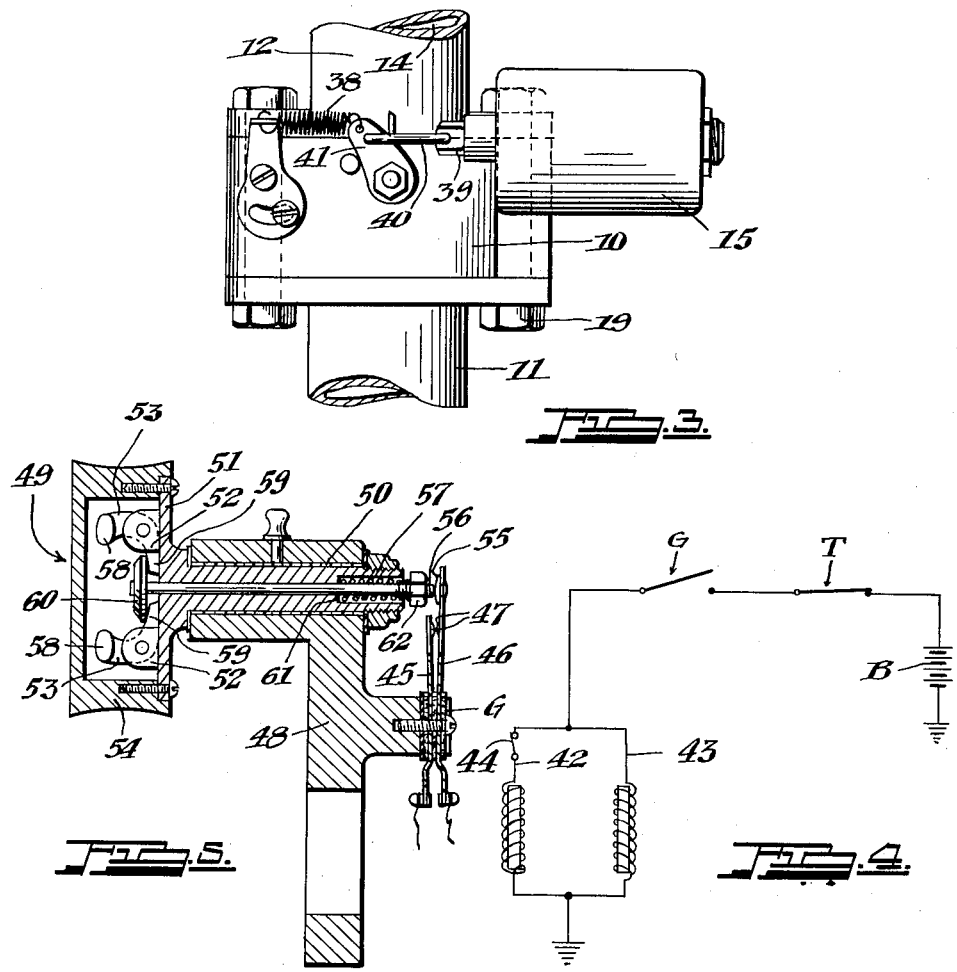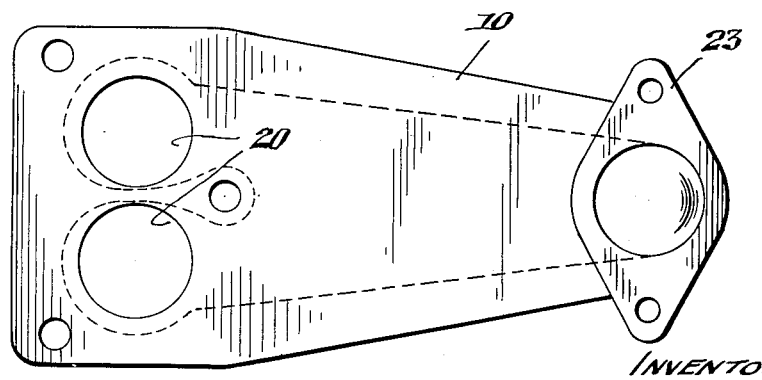

Patented July 3, 1951

2,558,843

UNITED STATES PATENT OFFICE 2,558,843

FUEL CONTROL DEVICE FOR INTERNAL-COMBUSTION ENGINES

John Alexander Grant, New Westminster, British Columbia, Canada

Application October 9, 1945, Serial No. 621,305

3 Claims. (Cl. 123—124)

This invention relates to a fuel control device for internal combustion engines which are subject to being driven by the load to which they are applied.

It frequently happens that when an automobile is travelling down hill its momentum is sufficient to cause the wheels of the vehicle to drive the engine instead of the engine driving the wheels and this condition becomes serious when, as usually happens, the accelerator pedal is released, the throttle butterfly valve returns to the idling position and a vacuum is created in the combustion chambers of the several cylinders of the engine.

As soon as the condition in which the wheels drive the engine has developed there is no further need for the admission of fuel to the combustion chambers and in view of this it would appear to be desirable to so adjust the throttle butterfly valve that when the accelerator is released the butterfly valve completely closes off the intake passageway to the intake manifold. Manufacturers have not done this, however, because of the extent of the vacuum which the pistons driven by the wheels of the automobile quickly create in the combustion chambers and in the manifolds. The result is that the manufacturers have provided a compromise which allows some air to travel past the butterfly valve in the idling position but at the same time permits the passage of fuel which is not required to drive the engine. Thus in the conventional automobile, gasoline is not only wasted but it drips down past the pistons and dilutes the oil in the crank case. The more serious disadvantages, however, arise from the fact that the vacuum formed in the combustion chambers draws oil up past the rings into the combustion chambers so that oil is burned, carbon is formed and spark plugs and valves are fouled.

In these circumstances various proposals have been made for automatically closing off the admission of fuel to the combustion chambers as soon as the wheels of an automobile start to drive the engine and at the same time by-passing air to the combustion chambers to relieve the vacuum which would otherwise be formed. The known devices of this type are, however, relatively complicated and expensive both in their original cost and in their upkeep so that they have not come into general use.

The object of the present invention is, therefore, to provide a relatively simple yet efficient device for automatically closing off the admission of fuel to the combustion chambers of an internal combustion engine of the type described and at the same time to admit air to such chambers.

A further object of the invention is to provide a device of this type which is electrically operated and in which the electric circuit therefor is only completed when both of two switches are closed, that is when the throttle valve is in the idling position but the engine speed has increased above idling speed.

Other objects and features of the invention will appear from the accompanying description with reference to the drawings in which Figure 1 is an elevation partly in section showing the control device in position below the throttle butterfly valve of an internal combustion engine, Figure 2 is a plan view of the control device according to Figure 1, Figure 3 is an end view of the installed device shown in Figure 1, Figure 4 is a circuit diagram, showing the switches in the position which they occupy when the throttle is in the idling position and the engine is at idling speed, Figure 5 is an elevation partly in section of the governor and governor switch; and Figure 6 is a plan view of a modified form of air channel member for use with a dual-barrelled carburetor.

The control device consists essentially of an air channel member 10 connected between the intake manifold 11 and the carburetor unit 12, a butterfly valve 13 for closing off the intake passageway 14 of the unit 12, a solenoid 15 for actuating the valve 13, a valve 16 for controlling the by-passing of air to the manifold 11 through the air-channel member 10, and a solenoid 17 for actuating the valve 16.

The air channel member 10 is connected between the respective flanges of the intake manifold and the carburetor unit 12 by bolts 18 and nuts 19 and it is formed with a passageway 20 which is of the same diameter as and is aligned with the intake passageway 14 and is formed with a channel 21 which leads from the passageway 20 to a casing 22 connected to the channel member 10 by means of flanges 23, bolts 24 and nuts 25.

The casing 22 which communicates with the atmosphere through a dust cover 26, is provided at the lower end with a throat 27 which is closed by the valve member 16 connected to the armature 28 of the solenoid 17. When the solenoid is not actuated the armature drops by gravity thus allowing the valve member or plate 16 to engage a rim 29 forming a valve seating at the top end of the throat 27. When the solenoid is actuated the armature is drawn up thus lifting the valve member 16 from the seating 29 and allowing air to pass into the throat 27 and channel 21 to the passageway 20.

As will be seen from Figure 1 the armature is formed at the end with a shoulder 30 and a neck 31 and the connection between the valve member 16 and the neck 31 is such as to permit a slight movement of the valve member 16 longitudinally of the armature and to permit the passage of air between the neck 31 and the plate when the shoulder 30 has been lifted clear of the plate. The result is a double action arrangement in which initial movement of the armature when the solenoid is energized lifts the shoulder 30 clear of the plate 16 and permits sufficient air to pass between the neck 31 and plate 16 to break the vacuum in the throat 27. The relatively weak solenoid 17 is then sufficient to lift the plate 16 from the seating 29.

The solenoid coil 32 is spaced from the wall of the casing 32 by ribs 33 so that air is permitted to pass freely around the outside of the coil and to the throat 27. This particular arrangement is important because it provides for cooling of the coil by the air passing around it and results in heating the air which is by-passed to the engine so that its running temperature is maintained. The amount of air passing through the throat 27 may be adjusted in accordance with the manifold vacuum of the engine in question by turning the plug 34 up or down thereby altering the limit of travel of the armature 28 and at the same time adjusting the magnetic field of the solenoid in accordance with the requirements. The plug 34 is threaded into a cap 35 and its adjustment is held by a lock nut 36.

As appears from Figure 1 the shaft 37 on which the butterfly valve 13 is pivoted is journalled in the member 10 above the point at which the channel 21 meets the passageway 20. In the normal operation of the automobile the butterfly valve 13 is held in the open position shown in Figures 1 and 2 by the action of the spring 38 and it is moved to the closed position on energization of the solenoid 15, the armature 39 of which is connected by a link 40 to a crank lever 41 connected to the shaft 37. When the butterfly valve 13 is thus moved to the closed position the mixture of fuel and air which would normally pass to the intake manifold 11 is prevented from doing so. When, as described below, the solenoid 17 is then energized, air is admitted to the manifold 11 through the cover 26, casing 22 and channel 21, thus preventing a vacuum developing in the combustion chambers.

The two solenoids are grounded through the metal air channel member 10 and they are energized through the respective leads 42 and 43, the lead 42 being connected to a switch 44 by means of which the solenoid 15 may be manually shorted out for test purposes. As appears from Figure 4 the leads 42 and 43 are then connected in series to a governor switch G and a throttle switch T illustrated respectively in Figures 5 and 1. Energy for the circuit is drawn from a battery B.

The switch G comprises two contact arms 45 and 46 each carrying a contact point 47 and mounted on a bracket 48 which carries a fly-ball-type governor 49. A sleeve 50 is journalled in the bracket 48 and it carries a plate 51 provided with lugs 52 on which the fly ball arms 53 are pivoted. A cover 54 is connected to the plate 51 and is provided with a shallow groove for engagement as a pulley by the conventional fan belt of an automobile.

The arm 46 is a leaf spring and it is provided with an extension which carries an insulating disc 55 normally engaged by the end of shaft 56 which extends through the sleeve 50 and is urged to the right in Figure 5 by spring 57 to hold the contact points 47 separated. As the speed at which the cover 54 is driven increases, the ball 58 of each fly ball arm 53 moves outwardly in known manner thereby moving the end 59 of each such arm to the left in Figure 5 so that each such end engages a head 60 connected to the shaft 56 and moves the shaft 56 to the left against the action of spring 57 thereby allowing the contacts 47 to close. The spring 57 abuts against the shoulder 61 and its compression is adjusted by the nut 62 in order to vary the speed at which the arms 53 overcome the spring and move the shaft 56 thereby allowing the contacts 47 to close. The speed at which the governor operates to close the contacts 47 is above the idling speed of the engine.

Because switches G and T are in series neither solenoid will be actuated unless the switch T is also closed. This consists of a fixed contact 63 and a moveable contact 64 carried by a leaf spring 65. As shown in Figure 1 the lever 66 which is actuated from the accelerator control by a rod or cable 67 and is connected to operate the throttle butterfly valve 68 is provided with an extension 69 extending therefrom at an angle. When the throttle is in the idling position the extension 69 engages an insulating disc 70 connected to the top surface of the leaf 65 and forces the leaf down until the contact 64 engages the contact 63. As soon as the throttle is moved from the idling position the contacts 63 and 64 are allowed to separate.

The two solenoids, one closing the butterfly valve 13 and the other opening the plate valve 16, are thus actuated simultaneously whenever the two switches G and T are both closed. The switch T is closed whenever the throttle butterfly valve is in the idling position and the switch G is closed whenever the engine exceeds the idling speed and therefore drives the pulley 54 fast enough to move the shaft 56 to the left and allows the contacts 47 to close. The switch G is thus closed during the normal running of the automobile but the switch T is only closed when the throttle is in the idling position so that both are closed only when the wheels of the automobile are driving the engine at more than idling speed.

What I claim as my invention is:

1. A fuel control device for internal combustion engines subject to being driven by a load, comprising in connection with the intake passage from the carburetor to the manifold a valve operable to close the intake passage, spring means adapted normally to hold said valve in the open position, a solenoid adapted to close said valve, a passage adapted to by-pass air to said intake passage on the manifold side of said valve, a valve adapted normally to close said air passage, a solenoid adapted to open the last mentioned valve, and a circuit for energizing said solenoids comprising two switches connected in series, one switch being closed only when the throttle is positioned for operation of the engine below a predetermined speed and the other switch being closed only when the engine is actually running above said predetermined speed.

2. A fuel control device for internal combustion engines subject to being driven by a load, comprising in connection with the intake passage from the carburetor to the manifold a valve operable to close the intake passage, spring means adapted normally to hold said valve in the open position, a solenoid adapted to close said valve, a passage adapted to by-pass air to said intake passage on the manifold side of said valve, a valve, means for heating the air in the air passage, said last-mentioned valve normally being closed, a solenoid adapted to open the last mentioned valves, means for heating the air in the air passage, and a circuit for energizing said solenoids comprising two switches connected in series, one switch being closed only when the throttle is positioned for operation of the engine below a predetermined speed and the other switch being closed only when the engine is actually running above said predetermined speed.

3. A fuel control device for internal combustion engines subject to being driven by a load, comprising in connection with the intake passage from the carburetor to the manifold a valve operable to close the intake passage, spring means adapted normally to hold said valve in the open position, a solenoid adapted to close said valve, a passage adapted to by-pass air to said intake passage on the manifold side of said valve, a valve adapted normally to close said air passage, a solenoid mounted in the air passage adapted to open the last-mentioned valve, the air passing through the air passage coming into contact with the solenoid, and a circuit for energizing said solenoids comprising two switches connected in series, one switch being closed only when the throttle is positioned for operation of the engine below a predetermined speed and the other switch being closed only when the engine is actually running above said predetermined speed.

JOHN ALEXANDER GRANT.

REFERENCES CITED

The following references are of record in the file of this patent:

UNITED STATES PATENTS

| Number | Name | Date |
|---|---|---|
| 109,476 | West | Nov. 22, 1870 |
| 1,077,503 | Anderson | Nov. 4, 1913 |
| 1,813,719 | White | July 7, 1931 |
| 1,887,515 | Pulkinghorn | Nov. 15, 1932 |
| 1,970,002 | Ericsson | Aug. 14, 1934 |
| 2,022,094 | Shoemaker | Nov. 26, 1935 |

FOREIGN PATENTS

| Number | Country | Date |
|---|---|---|
| 261,022 | Great Britain | Oct. 13, 1927 |